(12) United States Patent
Zheng

(10) Patent No.: US 11,710,342 B2
(45) Date of Patent: Jul. 25, 2023

(54) FINGERPRINT MATCHING METHOD AND APPARATUS, ELECTRONIC EQUIPMENT AND READABLE STORAGE MEDIUM

(71) Applicant: Shanghai Harvest Intelligence Technology Co., Ltd., Shanghai (CN)

(72) Inventor: Cijie Zheng, Shanghai (CN)

(73) Assignee: Shanghai Harvest Intelligence Technology Co., Ltd., Shanghai (CN)

( * ) Notice: Subject to any disclaimer, the term of this patent is extended or adjusted under 35 U.S.C. 154(b) by 0 days.

(21) Appl. No.: 17/225,712

(22) Filed: Apr. 8, 2021

(65) Prior Publication Data
US 2021/0319204 A1    Oct. 14, 2021

(30) Foreign Application Priority Data

Apr. 8, 2020 (CN) .......................... 202010270700.8

(51) Int. Cl.
  *G06V 40/12*   (2022.01)
  *G06V 10/75*   (2022.01)
(52) U.S. Cl.
  CPC ........ *G06V 40/1371* (2022.01); *G06V 10/757* (2022.01); *G06V 40/1347* (2022.01); *G06V 40/1365* (2022.01)
(58) Field of Classification Search
  None
  See application file for complete search history.

(56) References Cited

U.S. PATENT DOCUMENTS 6,314,197 B1 * 11/2001 Jain .................... G06V 40/1365
  382/125

2016/0147987 A1 * 5/2016 Jang ..................... G06V 40/1365
  726/19

FOREIGN PATENT DOCUMENTS

| CN | 1664847 A | 9/2005 |
|---|---|---|
| CN | 105787491 A | 7/2016 |
| CN | 107545217 A | 1/2018 |

(Continued)

OTHER PUBLICATIONS

Office Action issued in corresponding Chinese Patent Application No. 202010270700.8 dated Jun. 9, 2022.

(Continued)

*Primary Examiner* — Nicholas J Lee
(74) *Attorney, Agent, or Firm* — Harness, Dickey & Pierce, P.L.C.

(57) ABSTRACT

The present disclosure provides a fingerprint matching method and apparatus, an electronic equipment and a readable storage medium. The method includes: extracting a plurality of to-be-matched feature points from the to-be-identified fingerprint image; performing a first matching between the plurality of to-be-matched feature points and a plurality of template feature points in the template fingerprint image, wherein the first matching includes: identifying true feature points in the plurality of to-be-matched feature points, and determining feature point pairs each of which includes a true feature point and a template feature point corresponding to the true feature point in the template fingerprint image as a first matching result; removing at least one falsely matched feature point pair from the first matching result; and performing a second matching between the to-be-identified fingerprint image and the template fingerprint image based on remaining feature point pairs in the first matching result.

17 Claims, 3 Drawing Sheets

(56) References Cited

FOREIGN PATENT DOCUMENTS

CN          107862319 A        3/2018
WO     WO-2016127734 A1     8/2016

OTHER PUBLICATIONS

Ke Gui, "Research on Fingerprint Image Processing and Fingerprint Matching Algorithm," CMFD Information Technology Series, Dec. 15, 2010.
Yi Zhang, "A Novel Monocular Visual Odometry Method Based on Improved SURF Algorithm," Journal of Chongqing University of Posts and Telecommunications (Natural Science Edition), vol. 26 No. 3, Jun. 2014.
Liang Kai, "Research and Implement of Small Size Fingerpint Identification System Based on ARM," Dissertation Submitted to Shanghai Jiao Tong University for the Degree of Master, Jan. 2017.

* cited by examiner

FINGERPRINT MATCHING METHOD AND APPARATUS, ELECTRONIC EQUIPMENT AND READABLE STORAGE MEDIUM

CROSS-REFERENCE TO RELATED APPLICATIONS

The present application claims the benefit of priority to Chinese patent application No. 202010270700.8, filed on Apr. 8, 2020, entitled "Fingerprint Matching Method and Apparatus, Electronic Equipment and Readable Storage Medium", the entire disclosures of which are incorporated herein by reference.

TECHNICAL FIELD

The present disclosure relates to the technical field of fingerprint identification, and more particularly to a fingerprint matching method and an apparatus, an electronic equipment and a readable storage medium.

BACKGROUND

With development of information technology, biometric technology plays an increasing important role in ensuring information security, and fingerprint identification has become one of key technologies in identity recognition and device unlocking widely used in the field of mobile internet.

Existing fingerprint matching methods usually determine whether a to-be-matched feature point matches a corresponding feature point in a template fingerprint image based on information of a plurality of other feature points around the to-be-matched feature points.

However, above fingerprint matching methods are easily affected by pseudo feature points. Once there are pseudo feature points among the plurality of other feature points for fingerprint matching, a success rate of matching will be significantly reduced.

SUMMARY

The problem to be resolved by the present disclosure is how to improve the success rate of fingerprint matching.

An embodiment of the present disclosure provides a fingerprint matching method for matching a to-be-identified fingerprint image with a template fingerprint image. The method includes: extracting a plurality of to-be-matched feature points from the to-be-identified fingerprint image; performing a first matching between the plurality of to-be-matched feature points and a plurality of template feature points in the template fingerprint image, wherein performing the first matching includes: determining feature point pairs each of which includes a to-be-matched feature point and a template feature point corresponding to the to-be-matched feature point in the template fingerprint image as a first matching result; removing at least one feature point pair each of which includes a to-be-matched feature point and a template feature point that are falsely matched from the first matching result; and performing a second matching between the to-be-identified fingerprint image and the template fingerprint image based on remaining feature point pairs in the first matching result.

In some embodiments, the method further includes identifying true feature points in the plurality of to-be-matched feature points; wherein performing the first matching includes: determining feature point pairs each of which includes a true feature point and a template feature point corresponding to the true feature point in the template fingerprint image as the first matching result.

In some embodiments, identifying true feature points in the plurality of to-be-matched feature points includes: calculating a first direction difference between a first to-be-matched feature point in the to-be-identified fingerprint image and a first template feature point in the template fingerprint image, wherein the first to-be-matched feature point is one of the plurality of to-be-matched feature points, and the first template feature point is one of the plurality of template feature points; calculating a second direction difference between a first surrounding feature point and a second template feature point in the template fingerprint image, wherein the first surrounding feature point is one of a preset number of to-be-matched feature points surrounding the first to-be-matched feature point, and the second template feature point is one of template feature points surrounding the first template feature point; calculating a third direction difference between a first line formed of the first to-be-matched feature point and the first surrounding feature point and a second line formed of the first template feature point and the second template feature point; and determining the first to-be-matched feature point and the first surrounding feature point as true feature points when the first direction difference, the second direction difference and the third direction difference satisfy a first preset condition.

In some embodiments, performing the first matching further includes: determining a feature point pair including the first to-be-matched feature point and the first template feature point and a feature point pair including the first surrounding feature point and the second template feature point as the first matching result, when the first direction difference, the second direction difference and the third direction difference of the first to-be-matched feature point, the first template feature point, the first surrounding feature point and the second template feature point satisfy the first preset condition.

In some embodiments, the first preset condition includes that a difference between any two of the first direction difference, the second direction difference and the third direction difference is less than or equal to a first preset difference threshold.

In some embodiments, any feature point pair in the first matching result includes a second to-be-matched feature point in the to-be-identified fingerprint image and a third template feature point in the template fingerprint image, and removing the at least one feature point pair each of which includes a to-be-matched feature point and a template feature point that are falsely matched from the first matching result includes: calculating a distance between the to-be-matched feature point of each feature point pair in the first matching result and other to-be-matched feature points in the to-be-identified fingerprint image, and calculating a distance between the template feature point corresponding to the to-be-matched feature point and other template feature points in the template fingerprint image, wherein a first distance includes a distance between the second to-be-matched feature point and one of other to-be-matched feature points in the to-be-identified fingerprint image, and a second distance corresponding to the first distance includes a distance between the third template feature point and one of other template feature points corresponding to the one of other to-be-matched feature points in the template fingerprint image; obtaining how many times the first distance and the second distance corresponding to the first distance satisfy a second preset condition for all the feature point pairs, and sorting the feature point pairs in a descending order of obtained times; and selecting the feature point pairs with the obtained times that the first distance and the second distance corresponding to the first distance satisfy the second preset condition being larger than a preset threshold of times as truly matched feature point pairs, and removing other feature points that are determined as falsely matched feature point pairs from the first matching result.

In some embodiments, the second preset condition includes that a difference between the first distance and the corresponding second distance is greater than zero and less than a second preset difference threshold, or the first distance is equal to the corresponding second distance.

In some embodiments, performing the second matching between the to-be-identified fingerprint image and the template fingerprint image based on remaining feature point pairs in the first matching result includes: determining number of to-be-matched feature points in the to-be-identified fingerprint image that can be corresponding to the template feature points in the template fingerprint image; and determining fingerprint matching being successful when a ratio of the number of the to-be-matched feature points in the to-be-identified fingerprint image that can be corresponding to the template feature points in the template fingerprint image to a total number of the template feature points in the template fingerprint image is greater than a preset ratio threshold, otherwise determining the fingerprint matching being failed.

In some embodiments, performing the second matching between the to-be-identified fingerprint image and the template fingerprint image based on remaining feature point pairs in the first matching result further includes: rotating and moving the to-be-identified fingerprint image based on a relative position and an angle between a to-be-matched feature point and a template feature point in one of the remaining feature point pairs; and determining corresponding feature points between the to-be-identified fingerprint image and the template fingerprint image after rotating and moving the to-be-identified fingerprint image. Specifically, the moving includes a translational movement.

Another embodiment of the present disclosure provides a fingerprint matching apparatus for matching a to-be-identified fingerprint image with a template fingerprint image. The fingerprint matching apparatus includes: a feature point extraction circuitry, configured to extract a plurality of to-be-matched feature points from the to-be-identified fingerprint image; a first matching circuitry, configured to perform a first matching between the plurality of to-be-matched feature points and a plurality of template feature points in the template fingerprint image, wherein performing the first matching includes: determining feature point pairs each of which includes a to-be-matched feature point and a template feature point corresponding to the to-be-matched feature point in the template fingerprint image as a first matching result; an elimination circuitry, configured to remove at least one feature point pair each of which includes a to-be-matched feature point and a template feature point that are falsely matched from the first matching result; and a second matching circuitry, configured to perform a second matching between the to-be-identified fingerprint image and the template fingerprint image based on remaining feature point pairs in the first matching result.

In some embodiments, the first matching circuitry is further configured to: identify true feature points in the plurality of to-be-matched feature points; and determine feature point pairs each of which includes a true feature point and a template feature point corresponding to the true feature point in the template fingerprint image as the first matching result.

In some embodiments, the first matching circuitry includes: a first difference calculation sub circuitry, configured to calculate a first direction difference between a first to-be-matched feature point in the to-be-identified fingerprint image and a first template feature point in the template fingerprint image, wherein the first to-be-matched feature point is one of the plurality of to-be-matched feature points, and the first template feature point is one of the plurality of template feature points; a second difference calculation sub circuitry, configured to calculate a second direction difference between a first surrounding feature point and a second template feature point in the template fingerprint image, wherein the first surrounding feature point is one of a preset number of to-be-matched feature points surrounding the first to-be-matched feature point, and the second template feature point is one of template feature point surrounding the first template feature point; a third difference calculation sub circuitry, configured to calculate a third direction difference between a first line formed of the first to-be-matched feature point and the first surrounding feature point and a second line formed of the first template feature point and the second template feature point; and a first determining sub circuitry, configured to determine the first to-be-matched feature point and the first surrounding feature point as true feature points when the first direction difference, the second direction difference and the third direction difference satisfy a first preset condition.

In some embodiments, the first matching circuitry is further configured to: determine a feature point pair including the first to-be-matched feature points and the first template feature point and a feature point pair including the first surrounding feature points and the second template feature point as the first matching result, when the first direction difference, the second direction difference and the third direction difference of the first to-be-matched feature point, the first template feature point, the first surrounding feature point and the second template feature point satisfy the first preset condition.

In some embodiments, the first preset condition includes that a difference between any two of the first direction difference, the second direction difference and the third direction difference is less than or equal to a first preset difference threshold.

In some embodiments, any feature point pair in the first matching result includes a second to-be-matched feature point in the to-be-identified fingerprint image and a third template feature point in the template fingerprint image, and the elimination circuitry includes: a distance calculation sub circuitry, configured to calculate a distance between the to-be-matched feature point of each feature point pair in the first matching result and other to-be-matched feature points in the to-be-identified fingerprint image, and calculate a distance between the template feature point corresponding to the to-be-matched feature point and other template feature points in the template fingerprint image, wherein a first distance includes a distance between the second to-be-matched feature point and one of other to-be-matched feature points in the to-be-identified fingerprint image, and a second distance corresponding to the first distance includes a distance between the third template feature point and one of other template feature points corresponding to the one of other to-be-matched feature points in the template fingerprint image; a counting sub circuitry, configured to obtain how many times the first distance and the second distance corresponding to the first distance satisfy a second preset condition for all the feature point pairs, and sort the feature point pairs in a descending order of obtained times; and a selection sub circuitry, configured to select the feature point pairs with the obtained times that the first distance and the second distance corresponding to the first distance satisfy the second preset condition being larger than a preset threshold of times as truly matched feature point pairs, and remove other feature points that are determined as falsely matched feature point pairs from the first matching result.

In some embodiments, the second preset condition includes that a difference between the first distance and the corresponding second distance is greater than zero and less than a second preset difference threshold, or the first distance is equal to the corresponding second distance.

In some embodiments, the second matching circuitry is further configured to: determine number of to-be-matched feature points in the to-be-identified fingerprint image that can be corresponding to the template feature points in the template fingerprint image; and determine fingerprint matching being successful when a ratio of the number of the to-be-matched feature points in the to-be-identified fingerprint image that can be corresponding to the template feature points in the template fingerprint image to a total number of the template feature points in the template fingerprint image is greater than a preset ratio threshold, otherwise determining the fingerprint matching being failed.

In some embodiments, the second matching circuitry is further configured to: rotate and move the to-be-identified fingerprint image based on a relative position and an angle between a to-be-matched feature point and a template feature point in one of the remaining feature point pairs; and determine corresponding feature points between the to-be-identified fingerprint image and the template fingerprint image after the to-be-identified fingerprint image is rotated and moved.

Another embodiment of the present disclosure provides an electronic equipment including the fingerprint matching apparatus according to the present disclosure.

Another embodiment of the present disclosure provides a computer readable storage medium having computer instructions stored therein, wherein the computer instructions are executed by a processor to perform steps of the fingerprint matching method according to the present disclosure.

Another embodiment of the present disclosure provides an electronic equipment including a memory and a processor, wherein the memory is stored with computer instructions executable on the processor, wherein the computer instructions are executed by the processor to perform steps of the fingerprint matching method according to the present disclosure.

Compared with conventional technologies, embodiments of the present disclosure have following beneficial effects.

With above solution of the present disclosure, regardless of whether there are pseudo feature points in the plurality of to-be-matched feature points extracted from the to-be-identified fingerprint image, as long as there are true feature points, the feature point pairs including true feature points and template feature points corresponding to true feature points in the template fingerprint image serve as the first matching result and serve as a basis for subsequent second matching. The first matching result has minor effect by the pseudo feature points, thus the success rate of fingerprint identification can be effectively improved. Especially for the to-be-identified fingerprint image with low image quality (such as low signal-to-noise ratio) or weak preprocessing, the embodiments of the present disclosure can also improve the success rate of fingerprint matching and achieve better matching result. Then, the falsely matched feature point pairs are removed based on the first matching result, and the second matching is performed between the to-be-identified fingerprint image and the template fingerprint image based on the remaining feature point pairs in the first matching result. The removing of the falsely matched feature point pairs further improves the success rate and accuracy of the subsequent second matching. The fingerprint matching method according to the embodiments of the present disclosure performs the first matching and the second matching between the to-be-identified fingerprint image and the template fingerprint image, and removes the falsely matched feature point pairs in the first matching and the second matching, thereby substantially improving the accuracy of the fingerprint matching method.

Furthermore, the first matching includes determining whether a to-be-matched feature point is a true feature point according to relationships among the first direction difference between the first to-be-matched feature point and the first template feature point, the second direction difference between the first surrounding feature point and the second template feature point, and the third direction difference between the first line formed of the first to-be-matched feature point and the first surrounding feature point and the second line formed of the first template feature point and the second template feature point, thereby providing a more accurate, robust and easily realized method for identifying the true feature points in the to-be-identified fingerprint image.

Furthermore, removing falsely matched feature point pairs from the first matching result includes obtaining how many times the first distance and the second distance corresponding to the first distance satisfy the second preset condition for all the feature point pairs, sorting the feature point pairs in a descending order of obtained times; selecting the feature point pairs with the obtained times that the first distance and the second distance corresponding to the first distance satisfy the second preset condition being larger than the preset threshold of times as truly matched feature points, and removing other feature points that are determined as falsely matched feature point pairs from the first matching result, which easily realizes flexible control of the accuracy of the fingerprint matching method.

DETAILED DESCRIPTION

Some fingerprint matching methods perform a matching based on information of several other feature points around a to-be-matched feature point, such as type of the feature points, number of ridge lines which the feature points pass through and distances, to determine whether the to-be-matched feature point matches a template fingerprint image.

This method is susceptible to the influence of pseudo feature points. Once there are pseudo feature points in several other feature points used for fingerprint matching, a matching success rate will decrease significantly.

To this end, an embodiment of the present disclosure provides a fingerprint matching method. In this method, a preset number of feature points around each of a plurality of to-be-matched feature points are selected, and whether there is a true feature point in the plurality of to-be-matched feature points is firstly determined. Once there is a true feature point, a corresponding feature point pair composed of a corresponding to-be-matched feature point and a template feature point is determined as a first matching result for subsequent processing. Since the first matching result is less affected by the pseudo feature points, a success rate of fingerprint identification can be effectively improved.

In order to make above objectives, features and advantages of the present disclosure more obvious and understandable, specific embodiments of the present disclosure will be described in detail below with reference to accompanying drawings.

Figure 1:
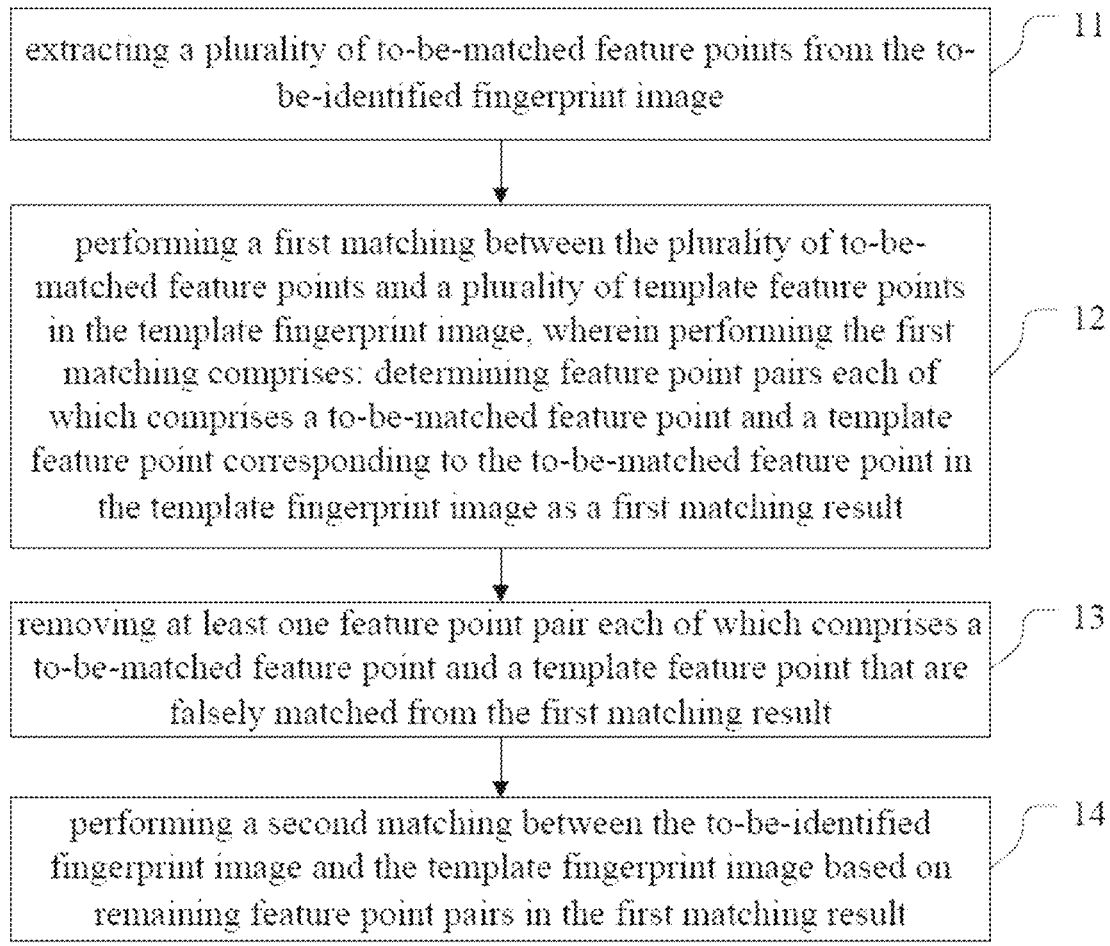
FIG. 1 is a flow chart of a fingerprint matching method according to an embodiment of the present disclosure.

As shown in FIG. 1, an embodiment of the present disclosure provides a fingerprint matching method for matching the to-be-identified fingerprint image with the template fingerprint image. Specifically, the method may include following steps:

Step 11: a plurality of to-be-matched feature points from the to-be-identified fingerprint image is extracted.

In a specific implementation, fingerprint information can be collected through a fingerprint module to obtain to-be-identified fingerprint images. There is no limit on the number of the to-be-identified fingerprint images. For any to-be-identified fingerprint image, the fingerprint matching method according to the present disclosure can be used to perform fingerprint matching.

In a specific implementation, a variety of methods can be used to extract the feature points of the to-be-identified fingerprint image. There is no limit on the methods as long as corresponding to-be-matched feature points can be extracted, and there is no limit on the number of the to-be-matched feature points.

Step 12: a first matching between the plurality of to-be-matched feature points and a plurality of template feature points in the template fingerprint image is performed. In some embodiments of the present disclosure, performing the first matching includes: determining feature point pairs each of which includes a to-be-matched feature point and a template feature point corresponding to the to-be-matched feature point in the template fingerprint image as a first matching result.

In some embodiments of the present disclosure, the method further includes identifying true feature points in the plurality of to-be-matched feature points, and performing the first matching includes: determining feature point pairs each of which includes a true feature point and a template feature point corresponding to the true feature point in the template fingerprint image as the first matching result.

In a specific implementation, a variety of methods can be used to identify whether there are true feature points in the plurality of to-be-matched feature points, which are not limited herein.

In some embodiments of the present disclosure, a direction difference between any to-be-matched feature point and corresponding feature point in the template fingerprint image and a direction difference between other to-be-matched feature points around any to-be-matched feature point and the corresponding feature point in the template fingerprint image can be used to determine whether there are true feature points in any to-be-matched feature point and corresponding feature points around any to-be-matched feature point.

Specifically, for ease of description, a first to-be-matched feature point is taken as one of the plurality of to-be-matched feature points, and a first surrounding feature point is taken as one of the preset number of feature points around the first to-be-matched feature point.

In order to more simply and accurately determine whether there are true feature points in each to-be-matched feature point and other to-be-matched feature points around each to-be-matched feature point, the true feature points in the plurality of to-be-matched feature points may be identified by following steps.

A first direction difference between the first to-be-matched feature point in the to-be-identified fingerprint image and a first template feature point in the template fingerprint image is calculated. The first to-be-matched feature point is one of the plurality of to-be-matched feature points, and the first template feature point is one of the plurality of template feature points.

A second direction difference between a first surrounding feature point and a second template feature point in the template fingerprint image is calculated. The first surrounding feature point is one of a preset number of to-be-matched feature points surrounding the first to-be-matched feature point, and the second template feature point is one of template feature point surrounding the first template feature point.

A third direction difference between a first line formed of the first to-be-matched feature point and the first surrounding feature point and a second line formed of the first template feature point and the second template feature point is calculated.

The first to-be-matched feature point and the first surrounding feature point are determined as true feature points when the first direction difference, the second direction difference and the third direction difference satisfy a first preset condition.

In some embodiments of the present disclosure, the first matching further includes: determining a feature point pair including the first to-be-matched feature point and the first template feature point and a feature point pair including the first surrounding feature point and the second template feature point as the first matching result, when the first direction difference, the second direction difference and the third direction difference of the first to-be-matched feature point, the first template feature point, the first surrounding feature point and the second template feature point satisfy the first preset condition.

In some embodiments of the present disclosure, the first preset condition includes that a difference between any two of the first direction difference, the second direction difference and the third direction difference is less than or equal to a first preset difference threshold.

Herein, the template fingerprint image is an image used for matching the to-be-identified fingerprint image. When the to-be-identified fingerprint image matches the template fingerprint image, the to-be-identified fingerprint image can be regarded as a fingerprint image of an user whose authentication is successful, otherwise it can be regarded as a fingerprint image of an user whose authentication is failed. The template fingerprint image may be pre-stored in an electronic equipment.

In some embodiments, a preset number of feature points around the to-be-matched feature point are selected, and a value of the preset number may be greater than or equal to one. Specifically, according to the principle of proximity, the preset number of feature points closest to the to-be-matched feature point can be selected.

Figure 2:
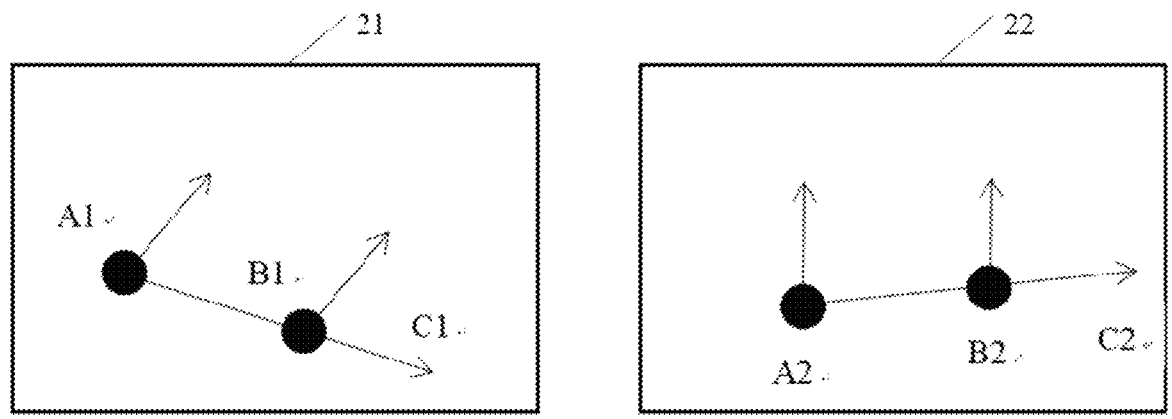
FIG. 2 is a schematic view showing matching of feature points according to an embodiment of the present disclosure.

With reference to FIG. 2, a to-be-matched feature point A1 in the to-be-identified fingerprint image is taken as the first to-be-matched feature point, and a first template feature point A2 in a template fingerprint image 22 corresponds to the first to-be-matched feature point A1. In the to-be-identified fingerprint image, a feature point B1 around the first to-be-matched feature point A1 is selected as the first surrounding feature point. A second template feature point B2 in the template fingerprint image 22 corresponds to the first surrounding feature point B1.

A direction of the first to-be-matched feature point A1 is a direction of a ridge line passing through the first to-be-matched feature point A1 in the to-be-identified fingerprint image 21. A direction of the first template feature point A2 is a direction of a ridge line passing through the first template feature point A2 in the template fingerprint image 22. A difference between the direction of the ridge line passing through the first to-be-matched feature point A1 and the direction of the ridge line passing through the first template feature point A2 is the first direction difference, which is denoted as A1-A2. Specifically, the first direction difference may be an angle between the direction of the first to-be-matched feature point A1 and the direction of the first template feature point A2.

A direction of the first surrounding feature point B1 is a direction of a ridge line passing through the first surrounding feature point B1 in the to-be-identified fingerprint image 21. A direction of the second template feature point B2 is a direction of a ridge line passing through the second template feature point B2 in the template fingerprint image 22. A difference between the direction of the ridge line passing through the first surrounding feature point B1 and the direction of the ridge line passing through the second template feature point B2 is a second direction difference, which is denoted as B1-B2. Specifically, the second direction difference may be an angle between the direction of the first surrounding feature point B1 and the direction of the second template feature point B2.

As shown in FIG. 2, a third direction difference between a first line C1 formed of the first to-be-matched feature point A1 and the first surrounding feature point B1 and a second line C2 formed of the first template feature point A2 and the second template feature point B2 is denoted as C1-C2. Specifically, the third direction difference may be an angle between the direction of the first line C1 and the direction of the second line C2.

It should be noted that extension directions of the first line C1 and the second line C2 are the same. For example, the first line C1 may extend from the first to-be-matched feature point A1 to the first surrounding feature point B1, and the second line C2 may extend from the first template feature point A2 to the second template feature point B2. Alternatively, the first line C1 extends from the first surrounding feature point B1 to the first to-be-matched feature point A1, and the second line C2 extends from the second template feature point B2 to the first template feature point A2.

In a specific implementation, a difference threshold can be set reasonably according to actual requirements. In an ideal state, the difference threshold may be 0, and in a non-ideal state, the difference threshold is an upper limit of an acceptable difference variation range.

When a difference between any two of the first direction difference A1-A2, the second direction difference B1-B2, and the third direction difference C1-C2 is less than or equal to the preset difference threshold, it indicates that the first to-be-matched feature point A1 and the first surrounding feature point B1 are true feature points, that is to say, corresponding feature points actually exist in the template fingerprint image 22. When the difference between any two of the first direction difference A1-A2, the second direction difference B1-B2 and the third direction difference C1-C2 is greater than the preset difference threshold, it indicates that the first to-be-matched feature point A1 and the first surrounding feature point B1 are pseudo feature points.

When the first surrounding feature point B1 around the first to-be-matched feature point A1 is a true feature point, the first matching between the first to-be-matched feature point A1 and the first template feature point A2 is successful, and the first matching between the first surrounding feature point B1 and the second template feature point B2 is successful, then a feature point pair composed of the first to-be-matched feature point A1 and the first template feature point A2 and a feature point pair composed of the first surrounding feature point B1 and the second template feature point B2 are feature point pairs in the first matching result. Thus, all the feature point pairs are obtained, and the first matching result is obtained.

It should be noted that for any to-be-matched feature point, whether there are true feature points in any to-be-matched feature point and other to-be-matched feature points around any to-be-matched feature point can be determined according to the description in above embodiments of the present disclosure.

In other embodiments, when identifying the true feature point in the plurality of to-be-matched feature points, the first direction difference, the second direction difference and the third direction difference should satisfy the first preset condition, and a distance |A1B1| from the first to-be-matched feature point A1 to the first surrounding feature point B1 and a distance |A2B2| from the first template feature point A2 to the second template feature point B2 should satisfy a third preset condition. Specifically, the third preset condition may be that an absolute value of a difference between |A1B1| and |A2B2| is greater than zero and less than a third preset difference threshold. The third preset difference threshold is a positive number, or |A1B1| is equal to |A2B2|.

Step 13: at least one feature point pair each of which includes a to-be-matched feature point and a template feature point that are falsely matched is removed from the first matching result.

In a specific implementation, although all feature points are successfully matched in the first matching result, there are still some falsely matched feature points. In order to remove falsely matched feature point pairs in the first matching result, following description will take any feature point pair composed of a second to-be-matched feature point in the to-be-identified fingerprint image and a third template feature point in the template fingerprint image in the first matching result as an example.

In some embodiments of the present disclosure, the falsely matched feature point pair from the first matching result may be removed by following steps.

Distances between two feature points of each feature point pair in the first matching result and other feature points in the to-be-identified fingerprint image are calculated. A distance between the second to-be-matched feature point and one of other feature point in the to-be-identified fingerprint image is a first distance, and a distance between the third template feature point and a corresponding feature point in the template fingerprint image is a second distance.

How many times that the first distance and the second distance corresponding to the first distance satisfy a second preset condition for all the feature point pairs is counted, and the feature point pairs are sorted in a descending order of obtained times. For each feature point pair, if the first distance and its corresponding second distance satisfy the second preset condition, it will be counted once.

The feature point pairs with the obtained times that the first distance and the second distance corresponding to the first distance satisfy the second preset condition being larger than a preset threshold of times as truly matched feature points, and the other feature points as falsely matched feature points are removed from the first matching result.

Figure 3:
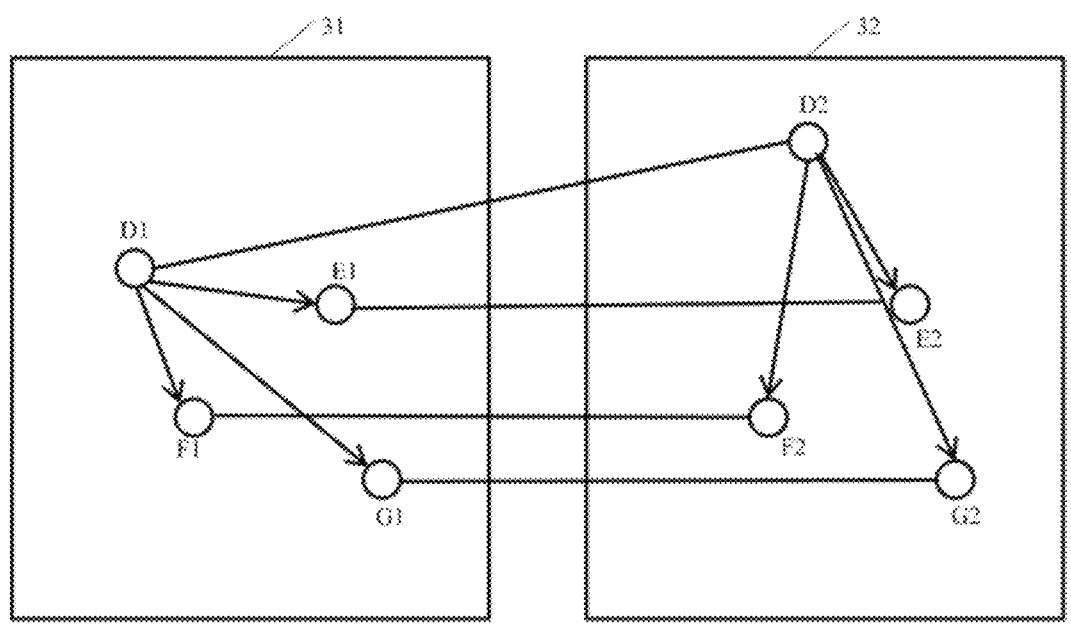
FIG. 3 is a schematic view showing matching of feature points according to another embodiment of the present disclosure.

In some embodiments of the present disclosure, the second preset condition includes that a difference between the first distance and the corresponding second distance is greater than zero and less than a second preset difference threshold, or the first distance is equal to the corresponding second distance With reference to FIG. 3, in a to-be-identified fingerprint image 31, a second to-be-matched feature point is D1, and other to-be-matched feature points are E1, F1 and G1. In a template fingerprint image 32, a third template feature point D2 corresponds to the second to-be-matched feature point D1, and a template feature point E2 corresponds to the to-be-matched feature point E1, and a template feature point F2 corresponds to the to-be-matched feature point F1, and a template feature point G2 corresponding to the to-be-matched feature point G1.

The first distance between the second to-be-matched feature point D1 and the to-be-matched feature point E1 is r1. The first distance between the second to-be-matched feature point D1 and the to-be-matched feature point F1 is r2. The first distance between the second to-be-matched feature point D1 and the feature point G1 is r3.

The second distance between the third template feature point D2 and the template feature point E2 is r1'. The second distance between the third template feature point D2 and the template feature point F2 is r2'. The second distance between the third template feature point D2 and the template feature point G2 is r3'.

In the feature point pair composed of the second to-be-matched feature point D1 and the third template feature point D2, the times that the first distance is equal to the second distance corresponding to the first distance may be three, for example, r1=r1', r2=r2', and r3=r3'. The times that the first distance is equal to the second distance corresponding to the first distance may be two, for example, r1=r1', r2=r2', but r3≠r3'. The times that the first distance is equal to the second distance corresponding to the first distance may also be one, for example, r1=r1', but r2≠r2', r3≠r3'. The times that the first distance is equal to the second distance corresponding to the first distance may also be zero, for example, r1≠r1', r2≠ r2' and r3≠r3'.

According to above method, the times that the first distance is equal to the corresponding second distance in each feature point pair of the first matching result is counted, and then sorted from large to small, and the second preset difference threshold and the threshold of times are set in advance. Then, in the feature point pairs, the feature point pairs with the times that the difference between the first distance and the second distance corresponding to the first distance is greater than zero and less than the second preset difference threshold, or the times that the first distance and the second distance corresponding to the first distance are greater than the preset threshold of times, are taken as truly matched feature point pairs, which is retained in the first matching result, and other feature point pairs are falsely matched feature points, which are removed from the first matching result. The threshold of times may be set according to actual requirements.

For example, the threshold of times may be set as 2. If the times that the first distance is equal to the second distance corresponding to the first distance is three in the feature point pair composed of the second to-be-matched feature point D1 and the third template feature point D2, the feature point pair composed of the second to-be-matched feature point D1 and the third template feature point D2 is the truly matched feature point pair. If the times that the first distance is equal to the second distance corresponding to the first distance is one in the feature point pair composed of the second to-be-matched feature point D1 and the third template feature point D2, the feature point pair composed of the second to-be-matched feature point D1 and the third template feature point D2 is the falsely matched feature point pair.

By removing the falsely matched feature point pair from the first matching result and deleting obvious falsely matched feature point pair in the first matching result, the accuracy of fingerprint matching can be improved.

Step 14: a second matching is performed between the to-be-identified fingerprint image and the template fingerprint image based on remaining feature point pairs in the first matching result.

In some embodiments, Step 14 includes following steps: determining number of to-be-matched feature points in the to-be-identified fingerprint image that can be corresponding to the template feature points in the template fingerprint image; and determining fingerprint matching being successful when a ratio of the number of the to-be-matched feature points in the to-be-identified fingerprint image that can be corresponding to the template feature points in the template fingerprint image to a total number of the template feature points in the template fingerprint image is greater than a preset ratio threshold, otherwise determining the fingerprint matching being failed. The preset ratio threshold can be set according to actual requirements and the number of the to-be-matched feature points. Specifically, the corresponding feature points between the to-be-identified fingerprint image and the template fingerprint image may be overlapping feature points between the to-be-identified fingerprint image and the template fingerprint image.

In a specific implementation, for the remaining feature point pairs, after the falsely matched feature point pairs are removed, the to-be-identified fingerprint image may be rotated and moved based on a relative position and an angle between two feature points in one of the remaining feature point pairs, and the corresponding feature points between the to-be-identified fingerprint image and the template fingerprint image may be determined after the to-be-identified fingerprint image is rotated and moved. If the two fingerprint images can be overlapped (that is, there are to-be-matched feature points of the to-be-matched fingerprint image in positions corresponding to several template feature points of the template fingerprint image), the more overlapping feature points, the higher the matching score.

It can be seen from above that in some embodiments of the present disclosure, whether there are true feature points in the plurality of to-be-matched feature points is judged firstly. As long as there are true feature points, the feature point pairs composed of the corresponding to-be-matched feature point and the template feature point are used as the first matching result for subsequent processing. Because the first matching result is less affected by the pseudo feature points, the success rate of fingerprint identification may be improved effectively.

In order for those skilled in the art to better understand and implement the present disclosure, the apparatus and computer readable storage medium corresponding to the above method are described in detail below.

Figure 4:
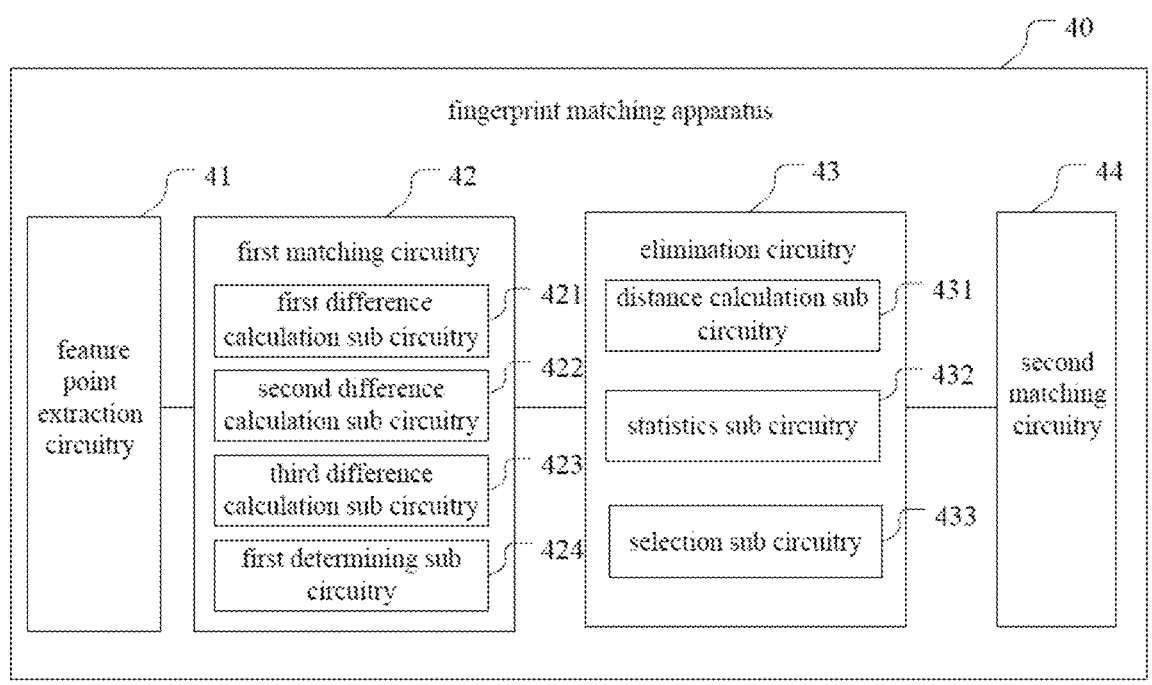
FIG. 4 is schematic view showing a structure of a fingerprint matching apparatus according to an embodiment of the present disclosure.

As shown in FIG. 4, another embodiment of the present disclosure provides a fingerprint matching apparatus 40 for matching a to-be-identified fingerprint image with a template fingerprint image. The fingerprint matching apparatus 40 includes a feature point extraction circuitry 41, a first matching circuitry 42, an elimination circuitry 43 and a second matching circuitry 44.

The feature point extraction circuitry 41 is configured to extract a plurality of to-be-matched feature points from the to-be-identified fingerprint image.

The first matching circuitry 42 is configured to perform a first matching between the plurality of to-be-matched feature points and a plurality of template feature points in the template fingerprint image. The first matching includes: determining feature point pairs each of which includes a to-be-matched feature point and a template feature point corresponding to the to-be-matched feature point in the template fingerprint image as a first matching result.

In some embodiments of the present disclosure, the first matching circuitry is further configured to: identify true feature points in the plurality of to-be-matched feature points, and determine feature point pairs each of which includes a true feature point and a template feature point corresponding to the true feature point in the template fingerprint image as the first matching result.

The elimination circuitry 43 is configured to remove an feature point pair each of which includes a to-be-matched feature point and a template feature point that are falsely matched from the first matching result.

The second matching circuitry 44 is configured to perform a second matching between the to-be-identified fingerprint image and the template fingerprint image based on remaining feature point pairs in the first matching result.

In some embodiments of the present disclosure, the first matching circuitry 42 includes a first difference calculation sub circuitry 421, a second difference calculation sub circuitry 422, a third difference calculation sub circuitry 423 and a first determining sub circuitry 424.

The first difference calculation sub circuitry 421 is configured to calculate a first direction difference between a first to-be-matched feature point in the to-be-identified fingerprint image and a first template feature point in the template fingerprint image. The first to-be-matched feature point is one of the plurality of to-be-matched feature points, and the first template feature point is one of the plurality of template feature points.

The second difference calculation sub circuitry 422 is configured to calculate a second direction difference between a first surrounding feature point and a second template feature point in the template fingerprint image. The first surrounding feature point is one of a preset number of to-be-matched feature points surrounding the first to-be-matched feature point, and the second template feature point is one of template feature point surrounding the first template feature point.

The third difference calculation sub circuitry 423 is configured to calculate a third direction difference between a first line formed of the first to-be-matched feature point and the first surrounding feature point and a second line formed of the first template feature point and the second template feature point.

The first determining sub circuitry 424 is configured to determine the first to-be-matched feature point and the first surrounding feature point as true feature points when the first direction difference, the second direction difference and the third direction difference satisfy a first preset condition.

In some embodiments of the present disclosure, the first matching circuitry 42 is further configured to: determine a feature point pairs including the first to-be-matched feature point and the first template feature point and a feature point pair including the first surrounding feature point and the second template feature point as the first matching result when the first direction difference, the second direction difference and the third direction difference of the first to-be-matched feature point, the first template feature point, the first surrounding feature point and the second template feature point satisfy the first preset condition.

In some embodiments of the present disclosure, the first preset condition includes that a difference between any two of the first direction difference, the second direction difference and the third direction difference is less than or equal to a first preset difference threshold.

In some embodiments of the present disclosure, any feature point pair in the first matching result includes a second to-be-matched feature point in the to-be-identified fingerprint image and a third template feature point in the template fingerprint image. The elimination circuitry 43 includes a distance calculation sub circuitry 431, a statistics sub circuitry 432 and a selection sub circuitry 433.

The distance calculation sub circuitry 431 is configured to calculate a distance between the to-be-matched feature point of each feature point pair in the first matching result and other to-be-matched feature points in the to-be-identified fingerprint image, and calculate a distance between the template feature point corresponding to the to-be-matched feature point and other template feature points in the template fingerprint image. A first distance includes a distance between the second to-be-matched feature point and one of other to-be-matched feature points in the to-be-identified fingerprint image, and a second distance corresponding to the first distance includes a distance between the third template feature point and one of other template feature points corresponding to the one of other to-be-matched feature points in the template fingerprint image.

The statistics sub circuitry 432 is configured to obtain how many times the first distance and the second distance corresponding to the first distance satisfy a second preset condition for all the feature point pairs, and sort the feature point pairs in a descending order of obtained times.

The selection sub circuitry 433 is configured to select the feature point pairs with the obtained times that the first distance and the second distance corresponding to the first distance satisfy the second preset condition being larger than a preset threshold of times as truly matched feature point pairs, and remove other feature points that are determined as falsely matched feature point pairs from the first matching result.

In some embodiments of the present disclosure, the second preset condition includes that a difference between the first distance and the corresponding second distance is greater than zero and less than a second preset difference threshold, or the first distance is equal to the corresponding second distance.

In some embodiments of the present disclosure, the second matching circuitry 44 is further configured to: determine number of to-be-matched feature points in the to-be-identified fingerprint image that can be corresponding to the template feature points in the template fingerprint image, and determine that fingerprint matching is successful when a ratio of the number of the to-be-matched feature points in the to-be-identified fingerprint image that can be corresponding to the template feature points in the template fingerprint image to a total number of the template feature points in the template fingerprint image is greater than a preset ratio threshold, otherwise determining that the fingerprint matching is failed.

In some embodiments of the present disclosure, the second matching circuitry 44 is further configured to: rotate and move the to-be-identified fingerprint image based on a relative position and an angle between a to-be-matched feature point and a template feature point in one of the remaining feature point pairs; and determine corresponding feature points between the to-be-identified fingerprint image and the template fingerprint image after the to-be-identified fingerprint image is rotated and moved.

The detailed functions of each component circuitry of the fingerprint matching apparatus according to the embodiments of the present disclosure can refer to the description of the corresponding part of the fingerprint matching method according to the preceding embodiments of the present disclosure, which will not be repeated herein.

Another embodiment of the present disclosure also provides an electronic equipment. The electronic equipment includes the fingerprint matching apparatus 40 according to the embodiments of the present disclosure.

Another embodiment of the present disclosure also provides a computer readable storage medium. The computer readable storage medium has computer instructions stored therein, and the computer instructions are executed by a processor to perform steps of the fingerprint matching method according to the embodiments of the present disclosure, which will not be repeated herein.

In a specific implementation, the computer readable storage medium may include ROM, RAM, a magnetic disk or an optical disk, etc.

Another embodiment of the present disclosure also provides an electronic equipment. The electronic equipment includes a memory and a processor. The memory is stored with computer instructions executable on the processor, and the computer instructions are executed by the processor to perform steps of the fingerprint matching method according to the embodiments of the present disclosure.

It should be noted that the relational terms herein such as first and second are used only to differentiate an entity or operation from another entity or operation, and do not require or imply any actual relationship or sequence between these entities or operations. In addition, term "comprise", "include", or any other variant thereof aims to cover non-exclusive "include", so that a process, method, object, or terminal device that comprises a series of elements not only comprises the elements, but also comprises other elements that are not definitely listed, or further comprises inherent elements of the process, method, object, or terminal device. In a case in which there are no more limitations, an element defined by the sentence "comprise . . . " or "include . . . " does not exclude the case in which other elements further exist in a process, method, or object, or terminal device that comprises the element. In addition, in this text, "greater than", "less than", "exceed", and the like are understood as not including the number. "More", "fewer", "within", and the like are understood as including the number.

A person skilled in the art should understand that the foregoing embodiments may provide a method, an apparatus, a device, or a computer program product. These embodiments may use forms of full hardware embodiments, full software embodiments, or embodiments of a combination of software and hardware aspects. All or some of the steps in the methods involved in the foregoing embodiments may be implemented by using a program instructing relevant hardware. The program may be stored in a computer device readable storage medium for performing all or some of the steps of the methods in the foregoing embodiments. The computer device includes but is not limited to: a personal computer, a server, a general-purpose computer, a dedicated computer, a network device, an embedded device, a programmable device, an intelligent mobile terminal, an intelligent home device, a wearable intelligent device, an in-vehicle intelligent device, and the like. The storage medium includes but is not limited to: a RAM, a ROM, a magnetic disk, a magnetic tape, an optical disc, a flash memory, a USB flash drive, a removable hard disk, a memory card, a memory stick, network server storage, network cloud storage, and the like.

Various logical modules and circuits described with reference to the embodiments disclosed with reference to this specification may be implemented or executed by using a general purpose processor, a digital signal processor (DSP), an application-specific integrated circuit (ASIC), a field-programmable gate array (FPGA) or another programmable logical component, a discrete gate or transistor logic, a discrete hardware component, or any combination designed to implement functions described in this specification. The general purpose processor may be a micro processor. However, in an alternative solution, the processor may be any conventional processor, controller, micro controller, or state machine. The processor may be any conventional processor, controller, micro controller, or state machine. The processor may be any conventional processor, controller, micro controller, or state machine. The processor may be alternatively implemented as a combination of computing devices, for example, a combination of a DSP and micro processor, multiple micro processors, one or more micro processor coordinated with a core of a DSP, or any other such configuration.

Steps of the method or algorithm described with reference to the embodiments disclosed in this specification may be directly reflected in hardware, a software module executed by the processor, or a combination of the two. The software module may reside in a RAM memory, a flash memory, a ROM memory, an EPROM memory, an EEPROM memory, a register, a hard disk, a removable disk, a CD-ROM, or a storage medium in any other form known in the art. Exemplarily, the storage medium is coupled to the processor, so that the processor can read information from and write information into the storage medium. In an alternative solution, the storage medium may be integrated into the processor. The processor and the storage medium may reside in the ASIC. The ASIC may reside in a user terminal. In an alternative solution, the processor and the storage medium may reside in the user terminal as discrete components.

The foregoing embodiments are described with reference to flowcharts and/or block diagrams of the method, the device (the system), and the computer program product in the embodiments. It should be understood that computer program instructions may be used for implementing each process and/or each block in the flowcharts and/or the block diagrams and a combination of a process and/or a block in the flowcharts and/or the block diagrams. These computer program instructions may be provided to a computer of a computer device to generate a machine, so that instructions executed by the processor of the computer device generate an apparatus configured to implement specific functions in one or more processes in the flowcharts and/or in one or more blocks in the block diagrams.

These computer program instructions may further be stored in a computer device readable memory that can instruct the computer device to work in a specific manner, so that the instructions stored in the computer device readable memory generate an artifact that includes an instruction apparatus. The instruction apparatus implements specific functions in one or more processes in the flowcharts and/or in one or more blocks in the block diagrams.

These computer program instructions may further be loaded onto a computer device, so that a series of operations and steps are performed on the computer device, thereby generating computer-implemented processing. Therefore, the instructions executed on the computer device provide steps for implementing specific functions in one or more processes in the flowcharts and/or in one or more blocks in the block diagrams.

Although the present disclosure has been disclosed above, the present disclosure is not limited thereto. Any changes and modifications may be made by those skilled in the art without departing from the spirit and scope of the present disclosure, and the scope of the present disclosure should be determined by the appended claims.

The invention claimed is:

1. A fingerprint matching method for matching a to-be-identified fingerprint image with a template fingerprint image, comprising:
   extracting a plurality of to-be-matched feature points from the to-be-identified fingerprint image;
   performing a first matching between the plurality of to-be-matched feature points and a plurality of template feature points in the template fingerprint image, wherein performing the first matching comprises: determining feature point pairs each of which comprises a to-be-matched feature point and a template feature point corresponding to the to-be-matched feature point in the template fingerprint image as a first matching result;
   removing at least one feature point pair each of which comprises a to-be-matched feature point and a template feature point that are falsely matched from the first matching result; and
   performing a second matching between the to-be-identified fingerprint image and the template fingerprint image based on remaining feature point pairs in the first matching result;
   wherein the fingerprint matching method further comprises:
   identifying true feature points in the plurality of to-be-matched feature points;
   wherein performing the first matching comprises: determining feature point pairs each of which comprises a true feature point instead of a pseudo feature point and a template feature point corresponding to the true feature point in the template fingerprint image as the first matching result;
   wherein identifying true feature points in the plurality of to-be-matched feature points comprises:
   calculating a first direction difference between a first to-be-matched feature point in the to-be-identified fingerprint image and a first template feature point in the template fingerprint image, wherein the first to-be-matched feature point is one of the plurality of to-be-matched feature points, and the first template feature point is one of the plurality of template feature points;
   calculating a second direction difference between a first surrounding feature point and a second template feature point in the template fingerprint image, wherein the first surrounding feature point is one of a preset number of to-be-matched feature points surrounding the first to-be-matched feature point, and the second template feature point is one of template feature points surrounding the first template feature point;
   calculating a third direction difference between a first line formed of the first to-be-matched feature point and the first surrounding feature point and a second line formed of the first template feature point and the second template feature point; and
   determining the first to-be-matched feature point and the first surrounding feature point as true feature points when the first direction difference, the second direction difference and the third direction difference satisfy a first preset condition.

2. The fingerprint matching method according to claim 1, wherein performing the first matching further comprises:
   determining a feature point pair comprising the first to-be-matched feature point and the first template feature point and a feature point pair comprising the first surrounding feature point and the second template feature point as the first matching result, when the first direction difference, the second direction difference and the third direction difference of the first to-be-matched feature point, the first template feature point, the first surrounding feature point and the second template feature point satisfy the first preset condition.

3. The fingerprint matching method according to claim 1, wherein the first preset condition comprises that a difference between any two of the first direction difference, the second direction difference and the third direction difference is less than or equal to a first preset difference threshold.

4. The fingerprint matching method according to claim 1, wherein any feature point pair in the first matching result comprises a second to-be-matched feature point in the to-be-identified fingerprint image and a third template feature point in the template fingerprint image, and removing the at least one feature point pair each of which comprises a to-be-matched feature point and a template feature point that are falsely matched from the first matching result comprises:
   calculating a distance between the to-be-matched feature point of each feature point pair in the first matching result and other to-be-matched feature points in the to-be-identified fingerprint image, and calculating a distance between the template feature point corresponding to the to-be-matched feature point and other template feature points in the template fingerprint image, wherein a first distance comprises a distance between the second to-be-matched feature point and one of other to-be-matched feature points in the to-be-identified fingerprint image, and a second distance corresponding to the first distance comprises a distance between the third template feature point and one of other template feature points corresponding to the one of other to-be-matched feature points in the template fingerprint image;
   obtaining how many times the first distance and the second distance corresponding to the first distance satisfy a second preset condition for all the feature point pairs, and sorting the feature point pairs in a descending order of obtained times; and selecting the feature point pairs with the obtained times that the first distance and the second distance corresponding to the first distance satisfy the second preset condition being larger than a preset threshold of times as truly matched feature point pairs, and removing other feature points that are determined as falsely matched feature point pairs from the first matching result.

5. The fingerprint matching method according to claim 4, wherein the second preset condition comprises that a difference between the first distance and the corresponding second distance is greater than zero and less than a second preset difference threshold, or the first distance is equal to the corresponding second distance.

6. The fingerprint matching method according to claim 1, wherein performing the second matching between the to-be-identified fingerprint image and the template fingerprint image based on remaining feature point pairs in the first matching result comprises:

determining number of to-be-matched feature points in the to-be-identified fingerprint image that can be corresponding to the template feature points in the template fingerprint image; and determining fingerprint matching being successful when a ratio of the number of the to-be-matched feature points in the to-be-identified fingerprint image that can be corresponding to the template feature points in the template fingerprint image to a total number of the template feature points in the template fingerprint image is greater than a preset ratio threshold, otherwise determining the fingerprint matching being failed.

7. The fingerprint matching method according to claim 1, wherein performing the second matching between the to-be-identified fingerprint image and the template fingerprint image based on remaining feature point pairs in the first matching result further comprises:

rotating and moving the to-be-identified fingerprint image based on a relative position and an angle between a to-be-matched feature point and a template feature point in one of the remaining feature point pairs; and determining corresponding feature points between the to-be-identified fingerprint image and the template fingerprint image after rotating and moving the to-be-identified fingerprint image.

8. A fingerprint matching apparatus for matching a to-be-identified fingerprint image with a template fingerprint image, comprising:

a feature point extraction circuitry, configured to extract a plurality of to-be-matched feature points from the to-be-identified fingerprint image;

a first matching circuitry, configured to perform a first matching between the plurality of to-be-matched feature points and a plurality of template feature points in the template fingerprint image, wherein performing the first matching comprises: determining feature point pairs each of which comprises a to-be-matched feature point and a template feature point corresponding to the to-be-matched feature point in the template fingerprint image as a first matching result;

an elimination circuitry, configured to remove at least one feature point pair each of which comprises a to-be-matched feature point and a template feature point that are falsely matched from the first matching result; and a second matching circuitry, configured to perform a second matching between the to-be-identified fingerprint image and the template fingerprint image based on remaining feature point pairs in the first matching result;

wherein the first matching circuitry is further configured to:

identifying true feature points in the plurality of to-be-matched feature points; and determining feature point pairs each of which comprises a true feature point instead of a pseudo feature point and a template feature point corresponding to the true feature point in the template fingerprint image as the first matching result;

wherein the first matching circuitry comprises:

a first difference calculation sub circuitry, configured to calculate a first direction difference between a first to-be-matched feature point in the to-be-identified fingerprint image and a first template feature point in the template fingerprint image, wherein the first to-be-matched feature point is one of the plurality of to-be-matched feature points, and the first template feature point is one of the plurality of template feature points;

a second difference calculation sub circuitry, configured to calculate a second direction difference between a first surrounding feature point and a second template feature point in the template fingerprint image, wherein the first surrounding feature point is one of a preset number of to-be-matched feature points surrounding the first to-be-matched feature point, and the second template feature point is one of template feature point surrounding the first template feature point;

a third difference calculation sub circuitry, configured to calculate a third direction difference between a first line formed of the first to-be-matched feature point and the first surrounding feature point and a second line formed of the first template feature point and the second template feature point; and a first determining sub circuitry, configured to determine the first to-be-matched feature point and the first surrounding feature point as true feature points when the first direction difference, the second direction difference and the third direction difference satisfy a first preset condition.

9. The fingerprint matching apparatus according to claim 8, wherein the first matching circuitry is further configured to:

determine a feature point pair comprising the first to-be-matched feature points and the first template feature point and a feature point pair comprising the first surrounding feature points and the second template feature point as the first matching result, when the first direction difference, the second direction difference and the third direction difference of the first to-be-matched feature point, the first template feature point, the first surrounding feature point and the second template feature point satisfy the first preset condition.

10. The fingerprint matching apparatus according to claim 8, wherein the first preset condition comprises that a difference between any two of the first direction difference, the second direction difference and the third direction difference is less than or equal to a first preset difference threshold.

11. The fingerprint matching apparatus according to claim 8, wherein any feature point pair in the first matching result comprises a second to-be-matched feature point in the to-be-identified fingerprint image and a third template feature point in the template fingerprint image, and the elimination circuitry comprises:

a distance calculation sub circuitry, configured to calculate a distance between the to-be-matched feature point of each feature point pair in the first matching result and other to-be-matched feature points in the to-be-identified fingerprint image, and calculate a distance between the template feature point corresponding to the to-be-matched feature point and other template feature points in the template fingerprint image, wherein a first distance comprises a distance between the second to-be-matched feature point and one of other to-be-matched feature points in the to-be-identified fingerprint image, and a second distance corresponding to the first distance comprises a distance between the third template feature point and one of other template feature points corresponding to the one of other to-be-matched feature points in the template fingerprint image;

a counting sub circuitry, configured to obtain how many times the first distance and the second distance corresponding to the first distance satisfy a second preset condition for all the feature point pairs, and sort the feature point pairs in a descending order of obtained times; and a selection sub circuitry, configured to select the feature point pairs with the obtained times that the first distance and the second distance corresponding to the first distance satisfy the second preset condition being larger than a preset threshold of times as truly matched feature point pairs, and remove other feature points that are determined as falsely matched feature point pairs from the first matching result.

12. The fingerprint matching apparatus according to claim 11, wherein the second preset condition comprises that a difference between the first distance and the corresponding second distance is greater than zero and less than a second preset difference threshold, or the first distance is equal to the corresponding second distance.

13. The fingerprint matching apparatus according to claim 8, wherein the second matching circuitry is further configured to:
determine number of to-be-matched feature points in the to-be-identified fingerprint image that can be corresponding to the template feature points in the template fingerprint image; and
determine fingerprint matching being successful when a ratio of the number of the to-be-matched feature points in the to-be-identified fingerprint image that can be corresponding to the template feature points in the template fingerprint image to a total number of the template feature points in the template fingerprint image is greater than a preset ratio threshold, otherwise determining the fingerprint matching being failed.

14. The fingerprint matching apparatus according to claim 8, wherein the second matching circuitry is further configured to:
rotate and move the to-be-identified fingerprint image based on a relative position and an angle between a to-be-matched feature point and a template feature point in one of the remaining feature point pairs; and
determine corresponding feature points between the to-be-identified fingerprint image and the template fingerprint image after the to-be-identified fingerprint image is rotated and moved.

15. An electronic equipment comprising a fingerprint matching apparatus for matching a to-be-identified fingerprint image with a template fingerprint image,
wherein the fingerprint matching apparatus comprises:
a feature point extraction circuitry, configured to extract a plurality of to-be-matched feature points from the to-be-identified fingerprint image;
a first matching circuitry, configured to perform a first matching between the plurality of to-be-matched feature points and a plurality of template feature points in the template fingerprint image, wherein performing the first matching comprises: determining feature point pairs each of which comprises a to-be-matched feature point and a template feature point corresponding to the to-be-matched feature point in the template fingerprint image as a first matching result;
an elimination circuitry, configured to remove at least one feature point pair each of which comprises a to-be-matched feature point and a template feature point that are falsely matched from the first matching result; and
a second matching circuitry, configured to perform a second matching between the to-be-identified fingerprint image and the template fingerprint image based on remaining feature point pairs in the first matching result;
wherein the first matching circuitry is further configured to:
identifying true feature points in the plurality of to-be-matched feature points; and
determining feature point pairs each of which comprises a true feature point instead of a pseudo feature point and a template feature point corresponding to the true feature point in the template fingerprint image as the first matching result;
wherein the first matching circuitry comprises:
a first difference calculation sub circuitry, configured to calculate a first direction difference between a first to-be-matched feature point in the to-be-identified fingerprint image and a first template feature point in the template fingerprint image, wherein the first to-be-matched feature point is one of the plurality of to-be-matched feature points, and the first template feature point is one of the plurality of template feature points;
a second difference calculation sub circuitry, configured to calculate a second direction difference between a first surrounding feature point and a second template feature point in the template fingerprint image, wherein the first surrounding feature point is one of a preset number of to-be-matched feature points surrounding the first to-be-matched feature point, and the second template feature point is one of template feature point surrounding the first template feature point;
a third difference calculation sub circuitry, configured to calculate a third direction difference between a first line formed of the first to-be-matched feature point and the first surrounding feature point and a second line formed of the first template feature point and the second template feature point; and
a first determining sub circuitry, configured to determine the first to-be-matched feature point and the first surrounding feature point as true feature points when the first direction difference, the second direction difference and the third direction difference satisfy a first preset condition.

16. A computer readable non-transitory storage medium having computer instructions stored therein, wherein the computer instructions are executed by a processor to perform steps of the fingerprint matching method according to claim 1.

17. An electronic equipment comprising a memory and a processor, wherein the memory is stored with computer instructions executable on the processor, wherein the computer instructions are executed by the processor to perform steps of the fingerprint matching method according to claim 1.

* * * * *